June 28, 1949.    J. LLOYD    2,474,585
CONTROL OF FLYING-WING AIRCRAFT
Filed May 9, 1944    3 Sheets-Sheet 1

Inventor
John Lloyd
by Mawhinney & Mawhinney
Attorneys

June 28, 1949. J. LLOYD 2,474,585
CONTROL OF FLYING-WING AIRCRAFT
Filed May 9, 1944 3 Sheets-Sheet 2

MAIN FLAP CONTROL TRIMMER CONTROL

INVENTOR.
JOHN LLOYD
BY Mawhinney & Mawhinney
ATTORNEYS.

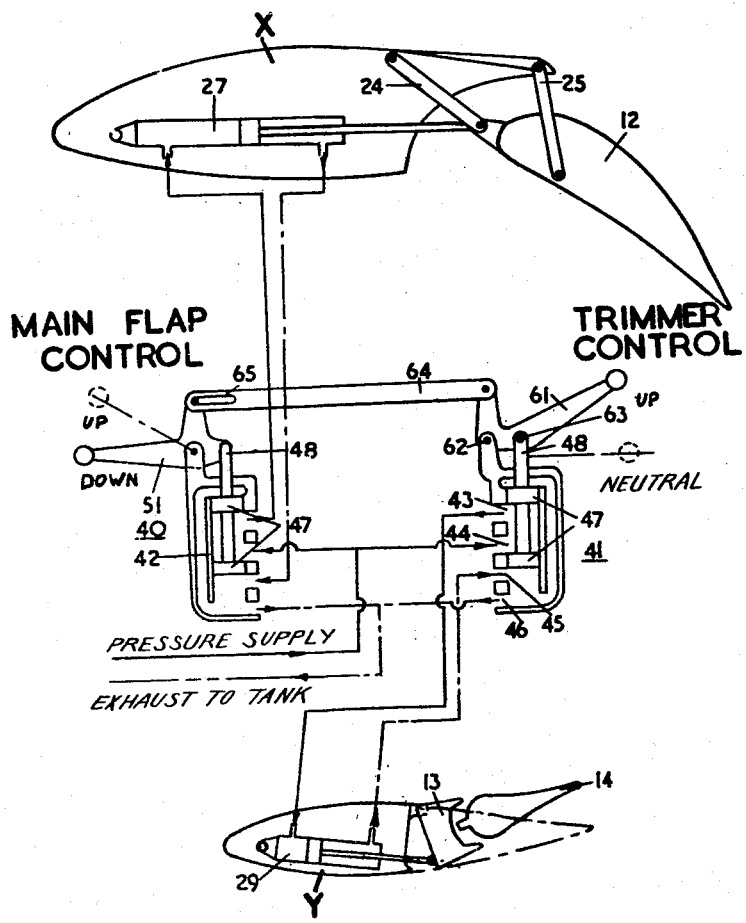

Patented June 28, 1949

2,474,585

UNITED STATES PATENT OFFICE 2,474,585

CONTROL OF FLYING-WING AIRCRAFT

John Lloyd, Coventry, England, assignor to Sir W. G. Armstrong Whitworth Aircraft Limited, Coventry, England Application May 9, 1944, Serial No. 534,763
In Great Britain August 28, 1943

5 Claims. (Cl. 244—13)

This invention relates to an aeroplane of the flying-wing type, that is, an aeroplane which essentially consists of a wing which is slightly V-shaped in plan view, the wing tips being trailing, and which has no fuselage or tail, the crew, pay or other load, engines, fuel tanks, etc., all being incorporated within the wing.

The present invention consists in that a main lifting flap (or flaps) constituting the trailing edge of the centre portion of the wing occupies not less than 35% of the mean wing chord over the span of the said centre portion. Preferably, the total span of the main lifting flap or flaps is less than one-third of the total wing span.

In a preferred arrangement the main lifting flap (or each of them) is of the type which is moved rearwardly when lowered, and it preferably has at its forward edge a slat which provides a "Handley Page" slot when the flap is lowered and moved rearwardly.

Moreover, in a preferred arrangement, there is arranged towards each wing tip a trimmer and control flap as described in the co-pending U. S. patent application filed concurrently herewith under Serial No. 534,762, now abandoned, the span of each trimmer being greater than half the total span of the main lifting flap or flaps. The operating means for the trimmer and main lifting flap may be interconnected so that the trimmer will be raised when the main lifting flap is sufficiently lowered.

Figure 1:
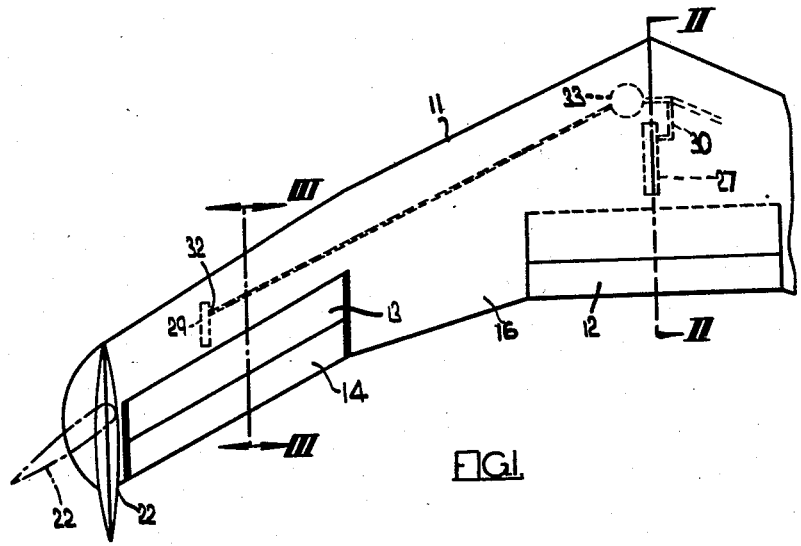
Figure 1 is a plan of just over half of a flying-wing aeroplane.
Figure 4:
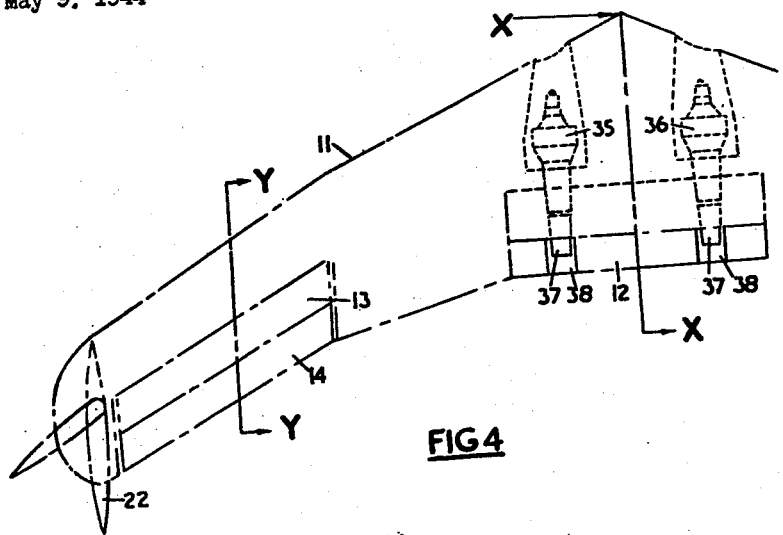
Figure 5:
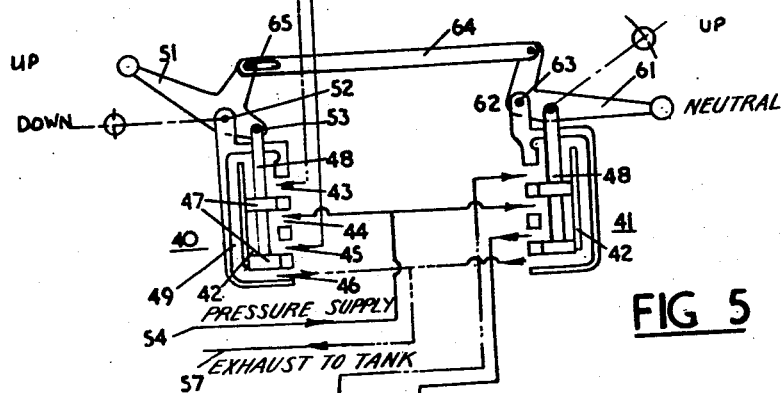

Figure 4 is an outline plan similar to Figure 1 but omitting the hydraulic control for the main lifting flap and the trimmer, and showing instead two jet-propulsion engines; and Figures 5 and 6 are two control diagrams in each of which the reference character X indicates a section taken on the line X—X of Figure 4, and the reference character Y a section taken on the line Y—Y of Figure 4. Figure 5 shows the position of the parts when the trimmer control is in the neutral position and the main flap control is up, i. e., the main lifting flap is inoperative. Figure 6 shows the parts when the main flap control has been moved down to lower the main lifting flap and also to raise the trimmer.

In the drawings 11 represents the leading edge, and at the centre portion of the trailing edge is a main lifting flap 12 extending over a relatively-small span, i. e., roughly 25% of the total wing span, or less. Although but a single main lifting flap is shown, it will be obvious that it could be sub-divided into two or more main lifting flaps if preferred. It occupies, however, not less than 35% of the mean wing chord over this span. It is arranged substantially as disclosed in British Patent Specification No. 588,043, being supported from the wing by links 24, 25, the former of which is connected to a bracket 26 fast with the flap. A two-way hydraulic jack 27 is pivotally mounted on the wing and hinged to the bracket 26 to actuate the flap 12.

Towards the tip of each wing is disposed a trimmer 13 carrying at its trailing edge a control flap 14 which can be used both as an elevator and as an aileron. In the present instance they occupy approximately 50% of the chord of the wing where they are situated, and approximately 40% of half the overall wing span. They are preferably arranged as disclosed in the co-pending patent specification aforesaid, the trimmer being operable by a two-way hydraulic jack 29.

For lowering the main lifting flap hydraulic pressure is supplied in the usual manner to the pipeline 30, whilst the pipeline 31 is open to exhaust, and vice versa. For raising the trimmer hydraulic pressure is supplied to the pipeline 32. Obviously a single valve 33 may, if desired, be utilized to supply both the pipelines 30 and 32 simultaneously. Thus, when the main lifting flap is lowered, the resulting downward pitching moment is counteracted by the trimmers being raised.

Between the main lifting flap 12 and the trimmer 13 there is a space 16 which, in the present instance, is shown as having no flap but which may, if desired, be provided with a flap.

Figure 2:
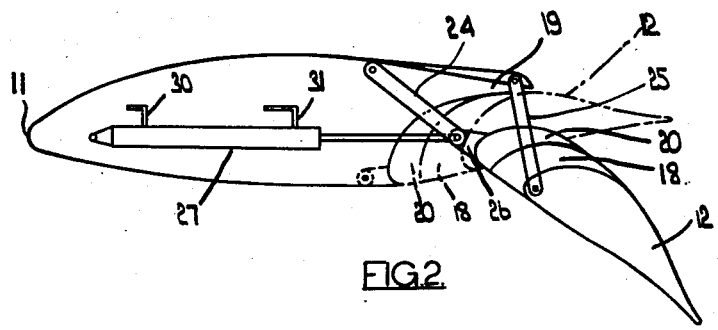
Figures 2 and 3 are cross-sections, respectively, on the lines II—II and III—III of Figure 1.
Figure 3:
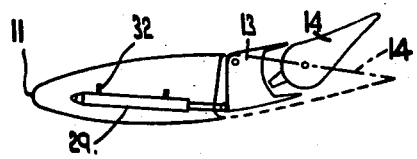

The main lifting flap 12 is preferably one which is moved rearwardly when lowered, and which also has a "Handley Page" slot, as shown at 18, when lowered, the slot in this case being screened by the upper edge 19 of the wing when the flap is nested against the wing, as shown by the dotted lines of Figure 2. If desired, the slat 20, in advance of the slot 18, may be movably mounted upon the main lifting flap 12 and arranged to be actuated as disclosed in British Patent Specification No. 588,216.

The movable rudder portion 22 is arranged on the wing tip outwardly of the trimmer 13 as shown, and it may be actuated by a known servo mechanism particularly when, for example, one engine has cut out and a very large rudder operation (as indicated by the dotted lines) is necessary, at the resulting slow speed, to provide directional control.

In the construction of Figure 4 I show two jet engines 35, 36 disposed in the centre portion of the aircraft. Their outlet ends 37 break through to the upper surface of the trailing edge of the centre portion as shown, and to accommodate them the main lifting flap 12 is downwardly recessed beneath them, as indicated at 38, 38.

Referring now to Figures 5 and 6, these show a control valve 40 for the main lifting flap 12 and a control valve 41 for the trimmers 13, though, for the sake of simplicity, the connections to only one of the trimmers 13 are shown. Each of these control valves, which are diagrammatically illustrated, comprises a cylinder 42 with ports 43, 44, 45 and 46 in one wall and with spaced plungers 47, on a plunger rod 48, by which these ports are controlled. 49 is a passage interconnecting port 46 with port 42.

From a consideration of Figure 5 it will be observed that when the main flap control 5, which is pivotally mounted at 52 and connected at 53 with the associated plunger rod 48, is in the up or inoperative position, hydraulic pressure passing along the piepline 54 from a suitable source is delivered by way of ports 44 and 45 to the right-hand end of jack cylinder 27 to act on the plunger 56 and maintain the main lifting flap 12 in the raised position. The left-hand end of the jack cylinder 27 is placed to exhaust, as indicated by the chain lines, by way of port 43, passage 49 and port 46, 57 representing the exhaust pipe.

It will also be observed that, in a rather similar manner, the pressure supply from pipe 54 is, in Figure 5, applied to the right-hand end of the jack cylinder 29 to force the plunger 59 to the left and thereby hold the trimmer 13 in the neutral position shown. The pressure supply is again shown by the full lines and the exhaust by the dotted lines.

If now the main flap control 51 be moved to the operative position, the valve plungers 47 are thrown over to the position shown by Figure 6, as a result of which the pressure supply entering by the pipe 54 will be delivered to the left-hand end of the jack cylinder 27 whilst the right-hand end will be opened to exhaust. Once more the full lines indicate the pressure supply and the chain lines the supply to exhaust.

The trimmer control 61, which is pivotally mounted at 62 and hinged at 63 to the associated plunger rod 48, is, in addition, connected to a link 64 having a pin-and-slot connection 65 with the control lever 51. Movement of the latter lever to the down position of Figure 6 will move the trimmer lever 61 to the up position, as shown in Figure 6; and it will be observed from a consideration of the latter figure that in these conditions the pressure supply is applied to the left-hand end of the jack cylinder 29 by way of the associated ports 44, 43, whilst the right-hand end thereof is connected to exhaust by way of the ports 45, 46.

Referring once more to Figure 5, it will be observed that by virtue of the pin-and-slot connection 65 the trimmer control 61 can be moved from the neutral to the up position independently of the main flap control 51 while the latter is up, thus to raise the trimmer, if the pilot so desires, when the lifting flap 12 has not been lowered, in which case the connections shown by Figure 6 will be made to the jack cylinder 29.

What I claim as my invention and desire to secure by Letters Patent of the United States is:

1. In an aeroplane of the flying-wing type, the combination of a main lifting flap means, having a span which is less than one-third of the total wing span, at the trailing edge of its centre portion, a trimmer towards each wing tip at the trailing edge thereof, each said trimmer carrying a respective control flap at its trailing edge, operating means for lowering said main lifting flap means from, and returning it to, a neutral position, a control for said main lifting flap operating means, operating means for raising said trimmers above, and returning them to, a neutral position, a control, independently actuable with respect to the first-mentioned control, for said trimmer operating means, and means pivotally connected to said second named operating means and to said first named operating means by a lost motion connection whereby, when the said main lifting flap means is lowered by actuation of said first-mentioned control said trimmers are automatically raised as a result of which the pitching moment resulting from the lowering of said main lifting flap means can be counteracted without it being necessary for the said control for the trimmer operating means to be actuated additionally.

2. In an aeroplane of the flying-wing type, the combination of a main lifting flap means, having a span which is less than one-third of the total wing span, at the trailing edge of its centre portion, a trimmer towards each wing tip at the trailing edge thereof, each said trimmer carrying a respective control flap at its trailing edge, servo means for lowering said main lifting flap means from, and returning it to, a neutral position, a control for said main lifting flap servo means, servo means for raising said trimmers above, and returning them to a neutral position, a control, independently actuable with respect to the first-mentioned control, for said trimmer servo means, and means pivotally connected to said trimmer operating means and to said main lift flap servo means by a lost motion connection whereby, when the said main lifting flap means is lowered by actuation of said first-mentioned control said trimmers are automatically raised as a result of which the pitching moment resulting from the lowering of said main lifting flap means can be counteracted without it being necessary for the said control for the trimmer servo means to be actuated additionally.

3. In an aeroplane of the flying-wing type, the combination of a main lifting flap means, having a span which is less than one-third of the total wing span, at the trailing edge of its centre portion, a trimmer towards each wing tip at the trailing edge thereof, each said trimmer carrying a respective control flap at its trailing edge, a double-acting hydraulic jack means for lowering said main lifting flap means from, and returning it to, a neutral position, a manually-actuable hydraulic control valve for said main lifting flap operating jack, a double-acting hydraulic jack means for raising said trimmers above, and returning them to, a neutral position, an independently manually-actuable hydraulic control valve for said trimmer operating jack, and lost-motion means interconnecting both of said hydraulic control valves so constructed and arranged that, when the said main lifting flap means is lowered by manual actuation of said first-mentioned hydraulic control valve said trimmers are automatically raised as a result of which the pitching moment resulting from the lowering of said main lifting flap means can be counteracted without it being necessary for the said hydraulic control valve for the trimmer operating jack to be manually actuated additionally.

4. In an aeroplane of the flying-wing type, the combination of a main lifting flap means, having a span which is less than one-third of the total wing span, at the trailing edge of its centre portion, a trimmer towards each wing tip at the trailing edge thereof, each said trimmer carrying a respective control flap at its trailing edge, a double-acting hydraulic jack, included in an hydraulic circuit, for lowering said main lifting flap means from, and returning it to, a neutral position, an hydraulic reversing valve to control the direction of operation of said main lifting flap operating jack, a manually-actuable control for said hydraulic reversing valve, a dobule-acting hydraulic jack, included in said hydraulic circuit, for raising each said trimmer above, and returning it to, a neutral position, a second hydraulic reversing valve to control the direction of operation of said trimmer operating jacks, a manually-actuable control for said second hydraulic reversing valve, a link pivoted to the manually-actuable control for said second hydraulic reversing valve, and a pin-and-slot connection between said link and the manually-actuable control first-mentioned whereby, when the said first-mentioned manually-actuable control is moved to lower said main lifting flap means, said link will transmit an effort for raising said trimmers automatically, as a result of which the pitching moment resulting from the lowering of said main lifting flap means can be counteracted without it being necessary for the said manually-actuable control for said second hydraulic reversing valve to be actuated additionally, the slot in the link permitting independent operation of the latter valve when said main lifting flap means is in its neutral position.

5. In an aeroplane of the flying-wing type, the combination of a main lifting flap means, having a span which is less than one-third of the total wing span, at the trailing edge of its centre portion, a trimmer, having a span which is greater than one-half of the span of said main lifting flap means, supported adjacent each wing tip at the trailing edge thereof, each said trimmer carrying a respective control flap at its trailing edge, operating means for lowering said main lifting flap means from, and returning it to, a neutral position, a control for said main lifting flap operating means, operating means for raising said trimmers above, and returning them to, a neutral position, a control, independently actuable with respect to the first-mentioned control, for said trimmer operating means, and means pivotally connected to said second named operating means and to said first named operating means by a lost motion connection whereby, when the said main lifting flap means is lowered by actuation of said first-mentioned control said trimmers are automatically raised as a result of which the pitching moment resulting from the lowering of said main lifting flap means can be counteracted without it being necessary for the said control for the trimmer operating means to be actuated additionally.

JOHN LLOYD.

REFERENCES CITED

The following references are of record in the file of this patent:

UNITED STATES PATENTS

| Number | Name | Date |
|---|---|---|
| D. 117,419 | Munk et al. | Oct. 31, 1939 |
| 2,172,289 | Munk | Sept. 5, 1939 |
| 2,222,915 | Rebeski | Nov. 26, 1940 |
| 2,293,644 | Gluhareff | Aug. 18, 1942 |
| 2,348,893 | Crook | Sept. 18, 1945 |
| 2,390,939 | Huff | Dec. 11, 1945 |